(12) United States Patent
Ribble et al.

(10) Patent No.: US 8,982,136 B2
(45) Date of Patent: Mar. 17, 2015

(54) RENDERING MODE SELECTION IN GRAPHICS PROCESSING UNITS

(75) Inventors: Maurice Ribble, Shrewsbury, MA (US); Colin Sharp, Cardiff, CA (US); Jeffrey Leger, Tyngsboro, MA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 13/108,657

(22) Filed: May 16, 2011

(65) Prior Publication Data

US 2012/0293519 A1 Nov. 22, 2012

(51) Int. Cl.
*G06T 15/00* (2011.01)
*G06T 1/20* (2006.01)

(52) U.S. Cl.
CPC ............... *G06T 1/20* (2013.01); *G06T 15/005* (2013.01)
USPC ............................. 345/522; 345/422; 345/501

(58) Field of Classification Search
USPC .......................................... 345/522, 422, 501
See application file for complete search history.

(56) References Cited

U.S. PATENT DOCUMENTS

| 7,777,748 | B2 | 8/2010 | Bakalash et al. |
| 8,031,194 | B2 | 10/2011 | Garritsen |
| 2003/0164833 | A1 | 9/2003 | Walls et al. |
| 2004/0125111 | A1 | 7/2004 | Tang-Petersen et al. |
| 2008/0012856 | A1* | 1/2008 | Yu et al. .......................... 345/424 |
| 2009/0027402 | A1* | 1/2009 | Bakalash et al. ............... 345/505 |
| 2009/0073187 | A1* | 3/2009 | Rampson et al. .............. 345/619 |
| 2009/0122068 | A1* | 5/2009 | Garritsen ....................... 345/522 |

FOREIGN PATENT DOCUMENTS

| GB | 2334869 A | 9/1999 |
| JP | 200679638 A | 3/2006 |
| WO | 0146905 A2 | 6/2001 |

OTHER PUBLICATIONS

Munshi et al., OpenGL® ES Common Profile Specification, Version 2.0.25 (Full Specification), Nov. 2, 2010, 204 pp.

(Continued)

*Primary Examiner* — Maurice L McDowell, Jr.
(74) *Attorney, Agent, or Firm* — James R. Gambale, Jr.

(57) ABSTRACT

This disclosure describes techniques for automatically selecting a rendering mode for use by a graphics processing unit (GPU) to render graphics data for display. More specifically, the techniques include evaluating at least two metrics associated with rendering graphics data of one or more rendering units, and automatically selecting either an immediate rendering mode or a deferred rendering mode for a current rendering unit based on the evaluated metrics. The selected rendering mode may be the one of the rendering modes predicted to use less power and/or system bandwidth to render the graphics data of the current rendering unit. A rendering unit may comprise a set of frames, a frame, a portion of a frame, multiple render targets associated with a frame, a single render target associated with a frame, or a portion of a single render target.

47 Claims, 6 Drawing Sheets

(56) References Cited

OTHER PUBLICATIONS

"Retained Mode Versus Immediate Mode", Build date: Oct. 5, 2010, <URL: http://msdn.microsoft.com/en-us/library/windows/desktop/ff684178(v=vs.85).aspx>.

International Search Report and Written Opinion—PCT/US2012/038175—ISA/EPO—Jul. 7, 2006.

Antochi I et al., "Memory Bandwidth Requirements of title-based rendering", Computer systems: Architectures, Modeling, and Simulation, Third and Fourth International Workshops, SAMOS 2003 and SAMOS 2004, Proceedings—Jul. 21-23, 2003 & Jul. 19-21, 2004—Samos, Greece (In: Lecture Notes in Computer Sciences) vol. 3133, Jan. 1, 2004, pp. 323-332, XP009126264.

\* cited by examiner

RENDERING MODE SELECTION IN GRAPHICS PROCESSING UNITS

TECHNICAL FIELD

This disclosure relates to processing data and, more particularly, processing data using a graphics processing unit (GPU).

BACKGROUND

A graphics processing unit (GPU) is a dedicated graphics rendering device utilized to process and display computerized graphics on a display device. GPUs are built with a highly-parallel structure that provides more efficient processing than typical, general-purpose central processing units (CPUs) for a range of complex algorithms. For example, the complex algorithms may correspond to representations of two-dimensional (2D) or three-dimensional (3D) computerized graphics.

GPUs may be included within graphics devices such as mobile wireless telephones, personal digital assistants (PDAs), video gaming devices, video gaming consoles, video conferencing units, laptop computers, desktop computers, tablet computers, television set-top boxes, integrated television graphics devices, digital recording devices, digital media players, global positioning system (GPS) devices, digital cameras, automotive displays, and the like. Graphics applications executed on the graphics devices may describe or define contents of a graphics scene by invoking application programming interface (API) calls, or instructions, which in turn use the GPU to render an image for display.

Rendering engines of GPUs may operate according to either an immediate rendering mode or a deferred rendering mode. When operating according to the immediate rendering mode, a rendering engine of a GPU renders graphics data directly to a frame buffer. When operating according to the deferred rendering mode, a rendering engine of a GPU performs a tiling pass to divide graphics data into a plurality of tiles, renders each of the plurality of tiles to a local tile buffer, and reads each for the rendered tiles from the tile buffer to a frame buffer. At present, the immediate rendering mode is most commonly used in graphics devices where power and system bandwidth are less of a concern, and the deferred rendering mode is most commonly used in mobile devices where power and system bandwidth are at a premium.

SUMMARY

This disclosure describes techniques for automatically selecting a rendering mode for use by a graphics processing unit (GPU) to render graphics data for display. More specifically, the techniques include evaluating at least two metrics associated with rendering graphics data of one or more rendering units, and automatically selecting either an immediate rendering mode or a deferred rendering mode for a current rendering unit based on the evaluated metrics. A rendering unit may comprise a set of frames, a frame, a portion of a frame, multiple render targets associated with a frame, a single render target associated with a frame, or a portion of a single render target. A current rendering unit may comprise the rendering unit that is currently being rendered by the GPU. The techniques for automatically selecting a rendering mode may be performed at each rendering boundary in the graphics data, i.e., when the GPU finishes rendering a previous rendering unit and begins rendering a current rendering unit.

The most efficient rendering mode may vary based on the performance of the GPU when rendering certain graphics data. The selected rendering mode, therefore, may be the one of the rendering modes predicted to use less power and/or less system bandwidth to render a current rendering unit of graphics data based on the evaluated metrics. The techniques of this disclosure include configuring a GPU to operate according to the selected rendering mode. In some cases, the techniques may also include receiving a manually selected rendering mode that overrides the automatically selected rendering mode. When a manually selected rendering mode is received, the GPU may be configured to operate according to the manually selected rendering mode.

In one example, this disclosure is directed to a method of processing graphics data comprising evaluating at least two metrics associated with rendering graphics data of one or more rendering units, automatically selecting a rendering mode for a current rendering unit as one of an immediate rendering mode and a deferred rendering mode based on the evaluated metrics, and configuring a graphics processing unit (GPU) to render graphics data of the current rendering unit according to the selected rendering mode.

In another example, this disclosure is directed to a graphics device for processing graphics data comprising a memory buffer that stores metrics associated with rendering graphics data of one or more rendering units, and one or more processors that evaluate at least two of the metrics, automatically select a rendering mode for a current rendering unit as one of an immediate rendering mode and a deferred rendering mode based on the evaluated metrics, and configures a graphics processing unit (GPU) to render graphics data of the current rendering unit according to the selected rendering mode.

In a further example, this disclosure is directed to a graphics device for processing graphics data comprising means for evaluating at least two metrics associated with rendering graphics data of one or more rendering units, means for automatically selecting a rendering mode for a current rendering unit as one of an immediate rendering mode and a deferred rendering mode based on the evaluated metrics, and means for configuring a graphics processing unit (GPU) to render graphics data of the current rendering unit according to the selected rendering mode.

In another example, this disclosure is directed to a computer-readable medium comprising instructions for processing graphics data that, when executed, cause one or more programmable processors to evaluate at least two metrics associated with rendering graphics data of one or more rendering units, automatically select a rendering mode for a current rendering unit as one of an immediate rendering mode and a deferred rendering mode based on the evaluated metrics, and configure a graphics processing unit (GPU) to render graphics data of the current rendering unit according to the selected rendering mode.

The details of one or more examples are set forth in the accompanying drawings and the description below. Other features, objects, and advantages will be apparent from the description and drawings, and from the claims.

DETAILED DESCRIPTION

This disclosure describes techniques for automatically selecting a rendering mode for use by a graphics processing unit (GPU) to render graphics data for display. More specifically, the techniques include evaluating at least two metrics associated with rendering graphics data of one or more rendering units, and automatically selecting either an immediate rendering mode or a deferred rendering mode for a current rendering unit based on the evaluated metrics. The selected rendering mode may be one of the rendering modes predicted to use less power and/or less system bandwidth to render the current rendering unit of the graphics data based on the evaluated metrics. A rendering unit may comprise a set of frames, a frame, a portion of a frame, multiple render targets associated with a frame, a single render target associated with a frame, or a portion of a single render target. A current rendering unit may comprise the rendering unit currently being rendered by the GPU. The techniques for automatically selecting a rendering mode may be performed at each rendering boundary in the graphics data, i.e., when the GPU finishes rendering a previous rendering unit and begins rendering.

Figure 1:
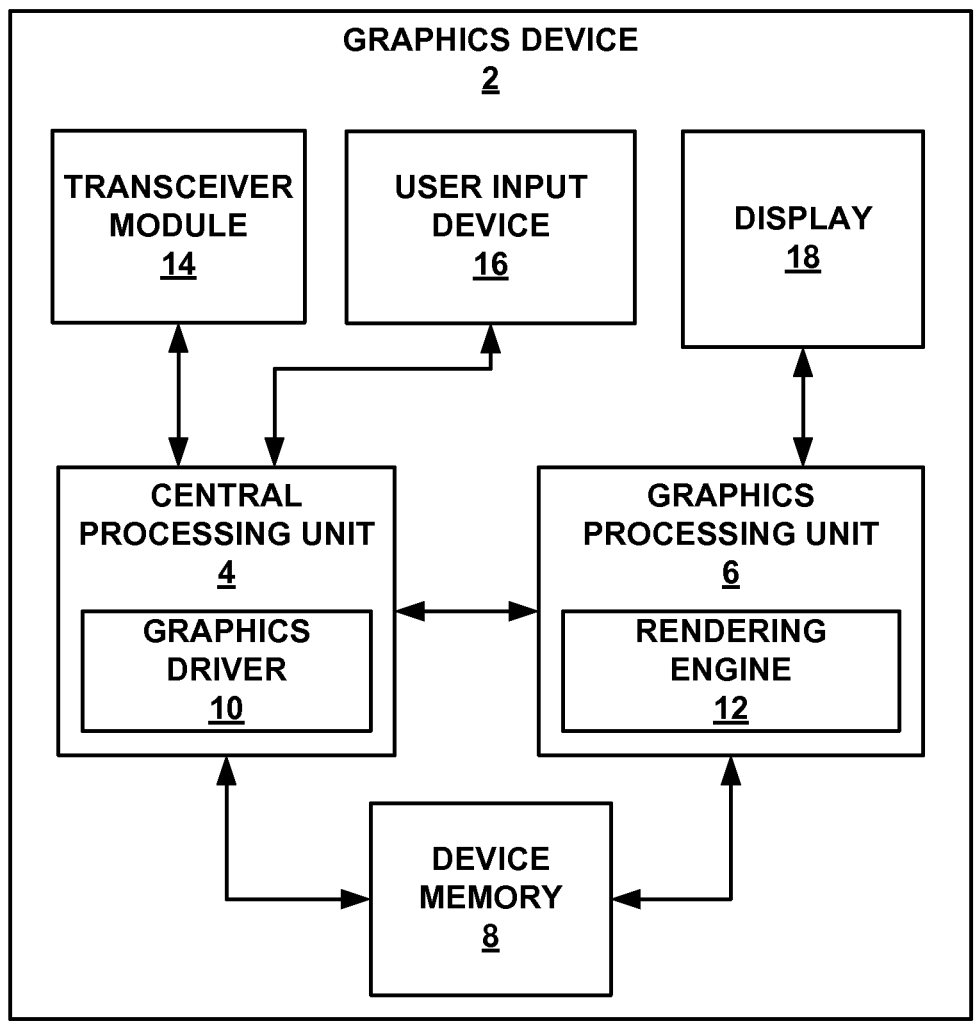
FIG. 1 is a block diagram illustrating a graphics device that includes a graphics driver configured to automatically select a rendering mode for use by a graphics processing unit (GPU).

FIG. 1 is a block diagram illustrating a graphics device 2 that includes a graphics driver 10 configured to automatically select a rendering mode for use by a graphics processing unit (GPU) 6. According to the techniques of this disclosure, graphics driver 10 may evaluate at least two metrics associated with rendering graphics data, automatically select a rendering mode for a current rendering unit based on the evaluated metrics, and configure GPU 6 to operate according to the selected rendering mode.

Graphics device 2 is capable of transmitting and receiving graphics data, supporting a variety of graphics data processing applications, and outputting processed graphics data for presentation to a user. Examples of graphics device 2 include, but are not limited to, mobile wireless telephones, personal digital assistants (PDAs), video gaming devices, video gaming consoles, video conferencing units, laptop computers, desktop computers, tablet computers, television set-top boxes, integrated television graphics devices, digital recording devices, digital media players, global positioning system (GPS) devices, digital cameras, automotive displays, and the like. Graphics data may comprise still image data, video data, or other multimedia data. In this disclosure, graphics data may often be described as video data that includes a plurality of sequential frames. It is not intended, however, to limit the types of graphics data that may be rendered according to the techniques of this disclosure.

In the example illustrated in FIG. 1, graphics device 2 includes a central processing unit (CPU) 4 with graphics driver 10, a GPU 6 with a rendering engine 12, a device memory 8, a transceiver module 14, a user input device 16, and a display 18. In other cases, for example, when graphics device 2 is a desktop computer, display 18 and/or user input device 16 may be external to graphics device 2. CPU 4 and GPU 6 may comprise digital signal processors (DSPs), general purpose microprocessor, application specific integrated circuits (ASICs), field programmable gate arrays (FPGAs), or other equivalent integrated or discrete logic circuitry. CPU 4 may be capable of controlling GPU 6.

Graphics device 2 may execute one or more graphics applications on CPU 4. Examples of graphics applications include web browsers, e-mail applications, spreadsheets, video games, computer-aided design (CAD) applications, digital camera applications, video conferencing applications, simulation and visualization tools, video streaming applications, or other applications that generate visual output for presentation to a user via display 18.

CPU 4 executes a graphics application by invoking application instructions for the graphics application, which use CPU 4 and/or GPU 6 to generate an image. In some cases, the application instructions may be generated from graphics application programming interface (API) calls. Graphics APIs for writing graphics applications may include Open Graphics Library (OpenGL®), OpenGL® for embedded systems (OpenGL® ES), or OpenVG (vector graphics) APIs. In the illustrated embodiment, graphics driver 10 runs on CPU 4. Graphics driver 10 may translate the application instructions or API calls into commands to be performed on CPU 4 and/or GPU 6. In some cases, GPU 6 may separately execute one or more graphics applications. In this case, GPU 6 may also execute its own graphics driver. In other examples, graphics driver 10 may be stored in device memory 8 such that either CPU 4 or GPU 6 could load graphics driver 10 for execution by that processing unit.

GPU 6 may perform commands issued by graphics driver 10 on CPU 4 in accordance with the graphics application to render graphics data into an image for presentation to a user via display 18. For example, GPU 6 may perform one or more of vertex shading, triangle rasterization, fragment shading, and pixel blending. GPU 6 may then store the rendered graphics data in a frame buffer in device memory 8. The graphics data may be rendered by GPU 6 on a per rendering unit basis. As described above, a rendering unit may comprise a set of frames, a frame, a portion of a frame, multiple render targets associated with a frame, a single render target associated with a frame, or a portion of a single render target. In some cases, a frame may include one or more render targets. Render targets may comprise frame buffers stored in device memory 8 that each holds a certain type of graphics data for a frame, such as texture data, color data, and depth data. GPU 6 may render graphics data within each of the render targets associated with the frame, and then combine the rendered graphics data for storage in device memory 8 and presentation on display 18 as the single frame.

In the illustrated example, GPU 6 includes a rendering engine 12 that may operate according to either an immediate rendering mode or a deferred rendering mode to render graphics data. When operating according to the immediate rendering mode, rendering engine 12 within GPU 6 renders graphics data of a rendering unit directly to a frame buffer in device memory 8. Rendering engine 12, therefore, makes all read and write calls for the graphics data being rendered to device memory 8 external to GPU 6. This mode may use a large amount of system bandwidth and power when performing certain graphics operations that require many readmodify-writes in device memory 8, such as pixel blending and depth testing, to render the graphics data.

When operating according to the deferred rendering mode, rendering engine 12 within GPU 6 may first perform a tiling pass to divide a current rendering unit into a plurality of tiles. For each of the plurality of tiles, rendering engine 12 then renders graphics data of the tile to a tile buffer located locally on GPU 6 and, when complete, reads the rendered graphics data from the tile buffer to a frame buffer in device memory 8. Rendering engine 12, therefore, makes a majority of read and write calls for the graphics data being rendered to the tile buffer on GPU 6. This mode, i.e., deferred rendering, uses a small amount of power and no system bandwidth to perform read-modify-writes in the tile buffer, but includes additional overhead costs of setting up the tiling pass and rendering each tile of the rendering unit.

Conventionally, a GPU within a laptop or desktop computer, or another type of wall-plugged graphics device in which power and bandwidth usage are not a concern, would likely be designed to operate according to the immediate rendering mode. On the contrary, a GPU within a mobile wireless telephone, or other mobile devices in which power and bandwidth are at a premium, would likely be designed to operate according to the deferred rendering mode. The most efficient rendering mode may vary, however, based on the performance of the GPU when rendering certain graphics data.

According to the techniques in this disclosure, graphics driver 10 may automatically select a rendering mode for use by GPU 6 to render graphics data for presentation to a user on display 18. More specifically, graphics driver 10 may evaluate at least two metrics associated with rendering graphics data, and automatically select either an immediate rendering mode or a deferred rendering mode for a current rendering unit based on the evaluated metrics. The metrics may include performance metrics, power metrics, or other metrics of CPU 4 and GPU 6 when rendering graphics data of a previous or current rendering unit. The selected rendering mode may be the one of the rendering modes predicted to use less system bandwidth and/or less power to render the graphics data of the current rendering unit based on the evaluated metrics. In some cases, the selected rendering mode may also be the rendering mode predicted to allow higher vertex throughput in CPU 4 and/or GPU 6, reduce overhead of graphics driver 10, or otherwise improve the performance and power consumption based on the evaluated metrics.

Graphics driver 10 may then configure GPU 6 to operate according to the selected rendering mode. In some cases, graphics driver 10 may also receive a manually selected rendering mode that overrides the automatically selected rendering mode. For example, graphics driver 10 may receive the manually selected rendering mode from a developer or other user via a graphics API executed on CPU 4. When a manually selected rendering mode is received, graphics driver 10 may configure GPU 6 to operate according to the manually selected rendering mode.

The techniques of this disclosure—including collecting and evaluating metrics, automatically selecting a rendering mode, and configuring GPU 6—may be performed at each rendering boundary. A rendering boundary may comprise a transition period between rendering units, e.g., when GPU 6 finishes rendering a previous rendering unit and begins rendering a current rendering unit. Once GPU 6 completes rendering of a previous rendering unit, GPU 6 switches from receiving data of the previous rendering unit to receiving data of a current rendering unit to be rendered. At that time, according to the techniques, graphics driver 10 may automatically select the rendering mode for the current rendering unit based on the evaluated metrics. If the rendering mode selected for the current rendering unit is different than the rendering unit used for the previous rendering unit, graphics driver 10 may also reconfigure GPU 6 to operate according to the newly selected rendering mode. CPU 4 may download one or more graphics applications via transceiver module 14. In addition, CPU 4 may download graphics data to be processed by CPU 4 and/or GPU 6 in accordance with the graphics applications via transceiver module 14. Transceiver module 14 may include circuitry to allow wireless or wired communication between graphics device 2 and another device or a network. Transceiver module 14 may include modulators, demodulators, amplifiers and other such circuitry for wired or wireless communication.

CPU 4 may store application instructions for each of the graphics applications within device memory 8. In addition, device memory 8 may store the graphics data to be processed by CPU 4 and/or GPU 6 in accordance with the graphics applications, and may also store processed graphics data received from CPU 4 and/or GPU 6. For example, device memory 8 may store rendered graphics data of a current rendering unit in a frame buffer. As another example, device memory 8 may store one or more render targets associated with a frame that each holds a certain type of graphics data for the frame, such as texture data, color data, and depth data. In some cases, device memory 8 may also include a desktop or display dedicated frame buffer into which rendered graphics data of a frame may be copied for presentation on display 18.

Device memory 8 may comprise one or more computer-readable storage media. Examples of device memory 8 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor.

Display 18 comprises an output device for graphics device 2. As an example, display 8 may comprise a liquid crystal display (LCD), a cathode ray tube (CRT) display, a plasma display, or another type of display device. In some cases, graphics device 2 may include speakers or other types of video and audio output devices. GPU 6 may provide processed graphics data for presentation to display 18. For example, GPU 6 may copy the rendered graphics data of a frame from a frame buffer to a desktop or display dedicated frame buffer within device memory 8 to present the frame to a user via display 18.

User input device 16 comprises one or more user input devices for graphics device 2. For example, user input device 16 may include a trackball, a mouse, a keyboard, a microphone and/or other types of input devices. In some examples, user input device 16 may comprise a touch screen and may be incorporated as a part of display 18. A user may select one or more graphics applications to be executed by CPU 4 via user input device 16. In the illustrated example, display 18 and user input device 16 are included in graphics device 2. In other examples, display 18 and/or user input device 16 may be external to graphics device 2.

Figure 2:
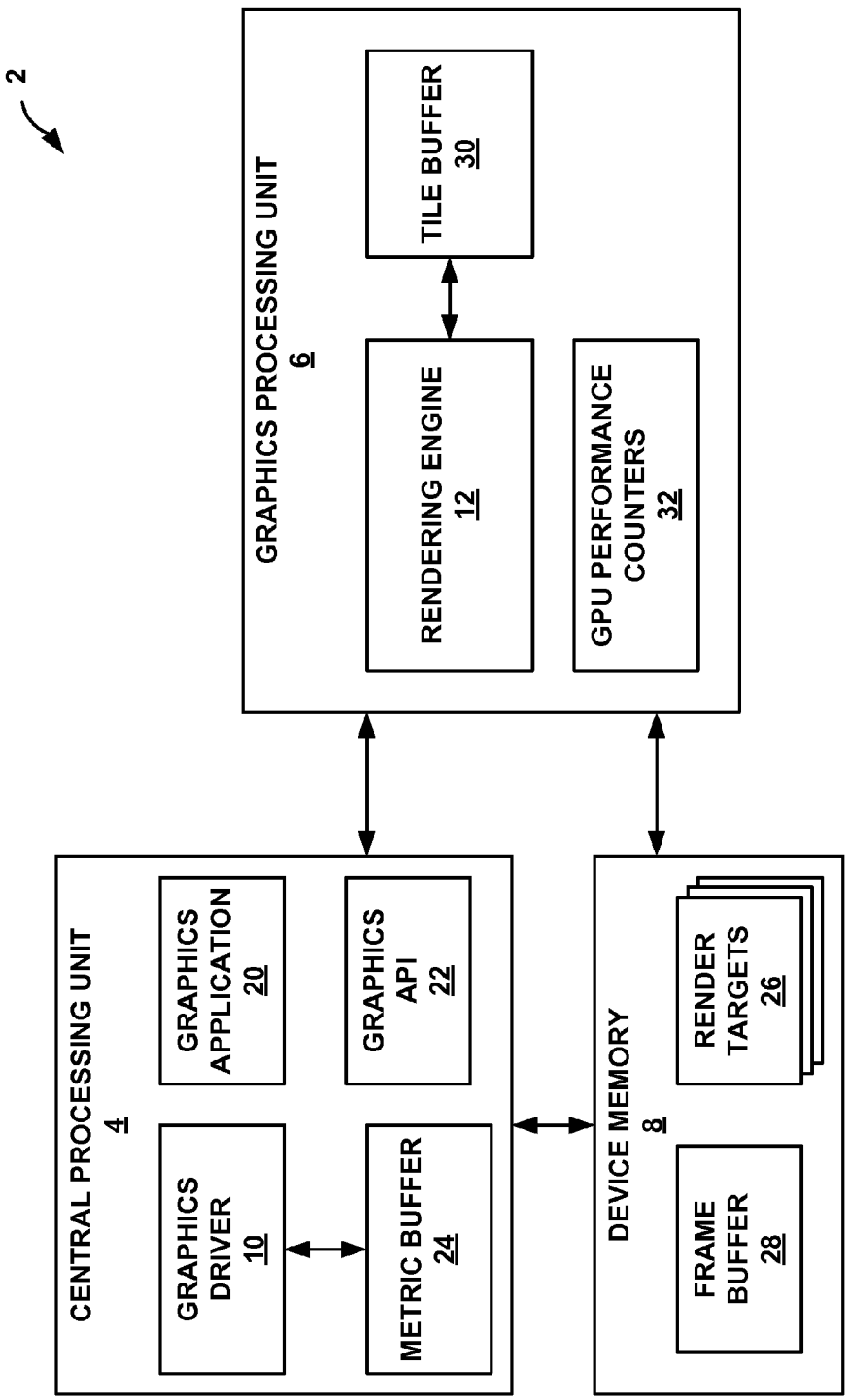
FIG. 2 is a block diagram illustrating, in more detail, functional blocks of the graphics device used by the graphics driver to automatically select a rendering mode for use by the GPU.

FIG. 2 is a block diagram illustrating, in more detail, functional blocks of graphics device 2 used by graphics driver 10 to automatically select a rendering mode for use by GPU 6. More specifically, FIG. 2 illustrates the interaction between CPU 4, GPU 6, and device memory 8 during the rendering mode selection process performed by graphics driver 10.

In the illustrated example of FIG. 2, CPU 4 executes a graphics application 20, a graphics API 22 and graphics driver 10. Graphics application 20 may include, for example, web browsers, e-mail applications, spreadsheets, video games, computer-aided design (CAD) applications, digital camera applications, video conferencing applications, simulation and visualization tools, video streaming applications, or other applications that generate visual output.

CPU 4 may execute graphics application 20 by invoking application instructions, which use CPU 4 and/or GPU 6 to generate an image. Application instructions may be stored in device memory 8. In some cases, the application instructions may be generated from graphics API calls made by graphics API 22, such as calls to draw primitives or triangles associated with the image. Graphics API 22 may comprise one of an Open Graphics Library (OpenGL®), OpenGL® for embedded systems (OpenGL® ES), or OpenVG (vector graphics) API. Graphics driver 10 may translate the application instructions or API calls from graphics API 22 into commands to be performed by CPU 4 and/or GPU 6 in accordance with graphics application 20.

In the illustrated example of FIG. 2, GPU 6 includes rendering engine 12, a tile buffer 30, and GPU performance counters 32. Rendering engine 12 may include one or more processing units used to process graphics data for display. For example, rendering engine 12 may comprise a vertex shader, a triangle rasterizer, a fragment shader, and/or a pixel blender. GPU performance counters 32 may comprise hardware counters that record processing information associated with GPU 6, including an amount of system bandwidth used by GPU 6 during rendering.

GPU 6 may perform commands issued by graphics driver 10 on CPU 4 in accordance with the graphics application to render graphics data into an image for presentation on display. For example, rendering engine 12 of GPU 6 may receive graphics data from device memory 8 and perform one or more of vertex shading, triangle rasterization, fragment shading, and pixel blending. GPU 6 may then eventually store the rendered graphics data in frame buffer 28 in device memory 8. The graphics data may be rendered by rendering engine 12 on a per rendering unit basis. A rendering unit may include, for example, a set of frames, a frame, a portion of a frame, multiple render targets associated with a frame, a single render target associated with a frame, or a portion of a single render target.

In some cases, one or more render targets 26 may be defined for a frame. Render targets 26 comprise frame buffers stored in device memory 8 that each holds a certain type of graphics data for a frame, such as texture data, color data, and depth data. Graphics data within each of render targets 26 associated with a given frame may be rendered separately by rendering engine 12 and then combined in frame buffer 28 in device memory 8. In some cases, render targets 26 may include multiple render targets that hold the same type of data, e.g., color data, for a frame. Rendering engine 12 may render the graphics data in the multiple render targets simultaneously. A different number of render targets 26 may be defined for each frame of the graphics data.

Rendering engine 12 of GPU 6 may operate according to either an immediate rendering mode or a deferred rendering mode to render graphics data. When operating according to the immediate rendering mode, rendering engine 12 within GPU 6 renders graphics data of a rendering unit directly to frame buffer 28 in device memory 8. Rendering engine 12, therefore, makes all read and write calls for the graphics data being rendered to device memory 8 located external to GPU 6.

When operating according to the deferred rendering mode, rendering engine 12 within GPU 6 first performs a tiling pass to divide a rendering unit into a plurality of tiles. For each of the plurality of tiles, rendering engine 12 then renders graphics data of the tile to tile buffer 30 located locally on GPU 6 and, when complete, reads the rendered graphics data from tile buffer 30 to frame buffer 28 in device memory 8. Rendering engine 12, therefore, makes a majority of read and write calls for the graphics data being rendered to tile buffer 30 on GPU 6. In the case where one or more render targets 26 are defined for a frame, rendering engine 12 must perform a tiling pass for each of render targets 26 and then render each tile for each of render targets 26 associated with the frame.

Tile buffer 30 is a small amount of very high bandwidth memory located on-chip with GPU 6. The size of tile buffer 30, however, is too small to hold graphics data for an entire rendering unit, so rendering engine 12 must perform multiple rendering passes to render the entire rendering unit. For example, rendering engine 12 may perform one rendering pass for each tile of a frame, or may perform one rendering pass for each tile for each of render targets 26 associated with a frame. In some cases, rendering engine 12 may also perform binning to determine which primitives of the rendering unit are visible within each of the tiles. If binning is not performed, rendering engine 12 of GPU 6 may use raster scissors to draw all the primitives or triangles included in the rendering unit for each tile being rendered. By performing binning, rendering engine 12 may only draw those primitives in the rendering unit that are visible within a given tile being rendered.

The deferred rendering mode may use less power and system bandwidth to render graphics data when the graphics data represents a complex graphics scene with pixel blending and depth testing that requires many read-modify-write functions. The deferred rendering mode, however, does include additional overhead costs of setting up the tiling pass and rendering graphics data for each tile of the rendering unit. The deferred rendering mode may be the most efficient rendering mode when the overhead cost of setting up a tiling pass and rendering a plurality of tiles for each rendering unit does not override the bandwidth reduction of the deferred rendering mode.

On the contrary, the immediate rendering mode may use less power and system bandwidth to render graphics data when the graphics data represents a simple graphics scene where the deferred rendering mode provides no bandwidth reduction but acts as a drain on processing resources. The immediate rendering mode may be the most efficient mode when the overhead cost of setting up a tiling pass and rendering a plurality of tiles for each rendering unit overrides any bandwidth reduction of the deferred rendering mode.

According to the techniques of this disclosure, graphics driver 10 may automatically select either the immediate rendering mode or the deferred rendering mode for use by GPU 6 based on which is predicted to use the least amount of system bandwidth and/or power to render graphics data of the current rendering unit. In general, graphics driver 10 may evaluate at least two metrics associated with rendering graphics data, select either the immediate rendering mode or the deferred rendering mode based on the evaluated metrics, and configure GPU 6 to operate according to the selected rendering mode. The automatic rendering mode selection process is described in more detail below.

Graphics driver 10 may select a rendering mode for a current rendering unit at a rendering boundary in the graphics data when GPU 6 is switching from a previous rendering unit to the current rendering unit. As described above, a rendering unit may include a set of frames, a frame, a portion of a frame, multiple render targets associated with a frame, a single render target associated with a frame, or a portion of a single render target. A rendering boundary may comprise a transition period between rendering units, e.g., when GPU 6 finishes rendering a previous rendering unit and begins rendering a current rendering unit. Once GPU 6 completes rendering of a previous rendering unit, GPU 6 switches from receiving data of the previous rendering unit to receiving data of a current rendering unit to be rendered. At that time, graphics driver 10 may automatically select the rendering mode for the current rendering unit.

In this way, as the graphics data changes and as the performance of CPU 4 and/or GPU 6 when rendering the graphics data changes, graphics driver 10 may switch the rendering mode used by GPU 6 for the current situation. For example, if the rendering mode selected for the current rendering unit is different than the rendering unit used for the previous rendering unit, graphics driver 10 may reconfigure GPU 6 to operate according to the newly selected rendering mode. According to the techniques, graphics driver 10 may switch the rendering mode for each of single or multiple render targets 26 associated with a frame, for each frame of the graphics data, or for each predefined set of frames of the graphics data.

At a given rendering boundary, graphics driver 10 may collect metrics associated with rendering graphics data of one or more rendering units. The metrics may be associated with the performance of CPU 4 and/or GPU 6 when rendering graphics data of a previous rendering unit and a current rendering unit. During processing of the graphics data, GPU 6 may be several frames behind CPU 4. Graphics driver 10, therefore, may collect metrics associated with rendering graphics data of a previous rendering unit from GPU 6 and collect metrics associated with rendering graphics data of a current rendering unit from CPU 4.

The metrics may include a number of vertices in a rendering unit, a number of fragments in a rendering unit, locations of fragments in the rendering unit, an amount of GPU bandwidth used during rendering, a load amount on registers of GPU 6 during rendering, a load amount on registers of CPU 4 during rendering, a number of render targets 26 defined for a frame, a number of multiple render targets (MRTs) defined for a frame, dimensions (e.g., height, width, bits per pixel) of render targets 26, whether depth testing is enabled for the rendering unit, whether blending is enabled for the rendering unit, whether stencil testing is enabled for the unit, a type of application executed on GPU 6, a number of graphics API calls to draw primitives for a rendering unit, and additional information from GPU performance counters 32. In addition, the metrics may also include whether scene overdraw occurs for the rendering unit, whether mid-render updates occur in render targets 26 during rendering, whether transform feedback is used, whether fragments in the rendering unit are read from frame buffer 28, a number of state updates for the rendering unit, and other metrics that may indicate a mid-frame resolve.

In general, it is relatively inexpensive for graphics driver 10 to collect the metrics, even on a per frame or per render target basis. Information from GPU performance counters 32, however, may be collected less frequently because, on some hardware, a performance stall of GPU 6 may be required to read GPU performance counters 32. Graphics driver 10 may then store the collected metrics in metric buffer 24. The process of collecting metrics is described in more detail with respect to FIGS. 3 and 5.

Graphics driver 10 next evaluates the metrics to predict which of the immediate rendering mode and the deferred rendering mode will use less power and/or system bandwidth to render the graphics data of the current rendering unit. Graphics driver 10 evaluates at least two of the metrics. By evaluating more than one metric, graphics driver 10 may gain a thorough understanding of the performance and power constrains associated with rendering the current rendering unit in order to make an efficient rendering mode selection.

For example, graphics driver 10 may evaluate at least the metrics of GPU bandwidth and a number of render targets defined for a frame. If graphics driver 10 only evaluated GPU bandwidth, it would fail to take into account the processing resources required to set up the tiling pass and render each tile of the rendering unit in the deferred rendering mode. By evaluating both GPU bandwidth and a number of render targets, graphics driver 10 may compare the bandwidth costs with the overhead costs to render graphics data of the current rendering unit to predict the most efficient rendering mode for use by GPU 6.

Graphics driver 10 may apply a weighting scheme to the at least two metrics. For example, graphics driver 10 may execute an algorithm that assigns certain amounts of weight to two or more of the metrics. The weighting scheme may apply an equal amount of weight to two or more of the metrics, or may apply a different amount of weight to each of the metrics. In some cases, the weighting scheme algorithm may be pre-programmed into graphics driver 10. In other cases, the weighting scheme algorithm may be set by a developer via graphics API 22. In this way, the weighting scheme algorithm may be varied over time based on a type of graphics data to be rendered, system requirements and performance of CPU 4 and GPU 6, or other considerations. The process of evaluating two or more metrics is described in more detail with respect to FIGS. 3 and 6.

Graphics driver 10 then automatically selects the immediate rendering mode or the deferred rendering mode based on the evaluated metrics. More specifically, graphics driver 10 may select the rendering mode predicted to use less power and/or system bandwidth to render the graphics data of the current rendering unit. In some cases, graphics driver 10 may select the rendering mode also predicted to allow higher vertex throughput in CPU 4 and/or GPU 6, reduce overhead of graphics driver 10, or otherwise improve the performance and power consumption based on the evaluated metrics.

In some cases, graphics driver 10 may also receive a manually selected rendering mode from a developer or other user. For example, graphics driver 10 may receive the manually selected rendering mode via graphics API 22 executed on CPU 4. In some cases, the manual selection may comprise an indication or a hint regarding a preferred one of the rendering modes to graphics driver 10. The manually selected rendering mode received by graphics driver 10 may override the automatically selected rendering mode. In this way, a developer may be able to control the rendering mode used by GPU 6 regardless of which rendering mode is predicted to use less power and/or system bandwidth during rendering.

Regardless of whether the rendering mode is automatically selected based on evaluated metrics or manually selected by a user, graphics driver 10 configures GPU 6 to operate according to the selected rendering mode to render graphics data of the current rendering unit. Configuring GPU 6 may comprise programming registers of GPU 6 to send the rendered graphics data output from rendering engine 12 directly to frame buffer 28, in the case of the immediate rendering mode, or to tile buffer 30, in the case of deferred rendering mode. For example, when the immediate rendering mode is selected, graphics driver 10 may configure rendering engine 12 of GPU 6 to render graphics data of the current rendering unit directly to frame buffer 28 in device memory 8. On the contrary, when the deferred rendering mode is selected, graphics driver 10 may configure rendering engine 12 of GPU 6 to perform a tiling pass that divides the current rendering unit into a plurality of tiles, render graphics data of each of the plurality of tiles to tile buffer 30, and read each for the rendered tiles from the tile buffer to frame buffer 28.

Figure 3:
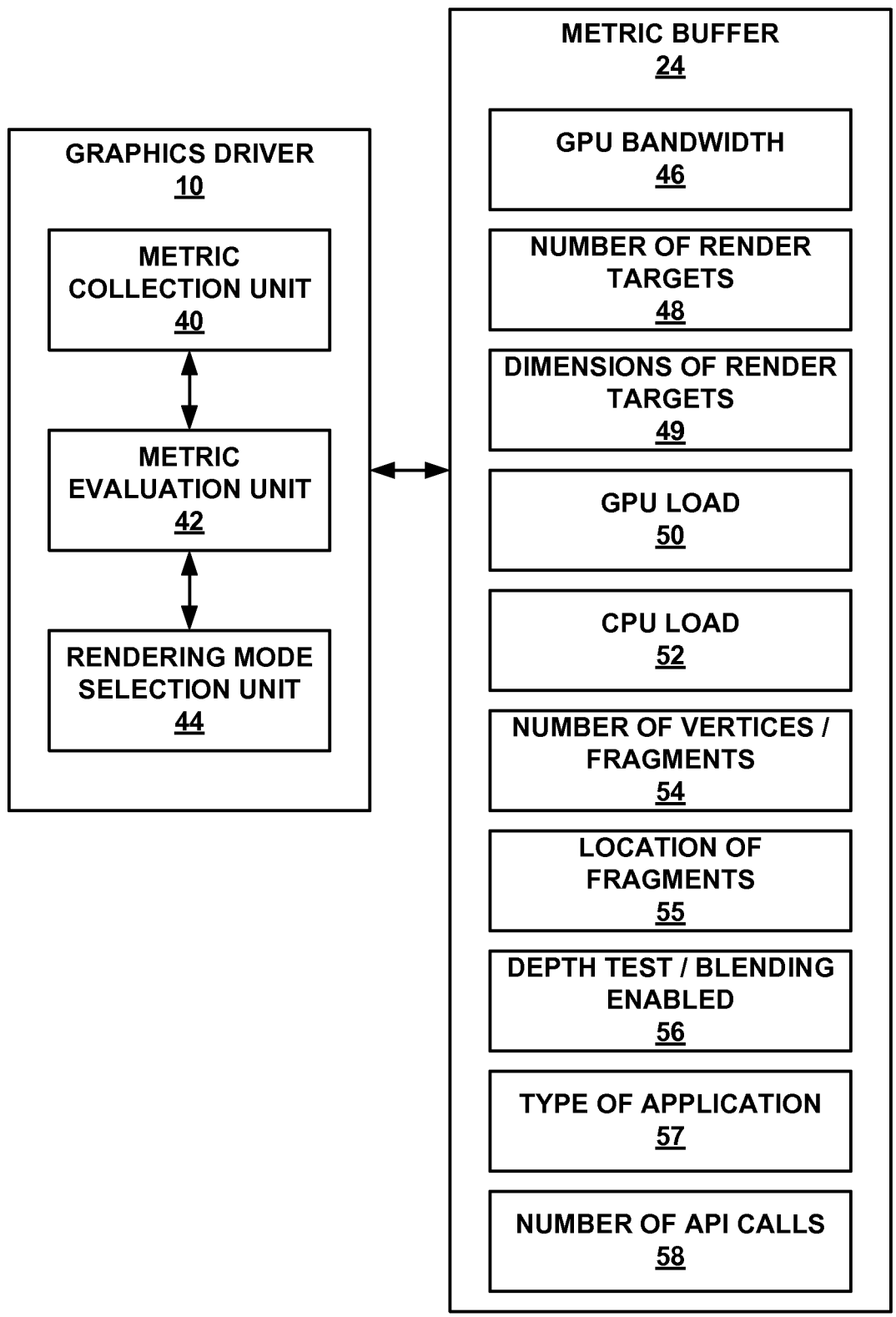
FIG. 3 is a block diagram illustrating exemplary functional blocks of the graphics driver configured to automatically select a rendering mode for use by the GPU.

Graphics driver 10 may then provide graphics data of the current rendering unit to rendering engine 12 of GPU 6 to be rendered according to the selected rendering mode. When GPU 6 reaches a rendering boundary in the graphics data, GPU 6 will switch to the next rendering unit. As described above, a rendering boundary may comprise a transition period between rendering units, such as a set of frames, a frame, a portion of a frame, multiple render targets associated with a frame, a single render target associated with a frame, or a portion of a single render target. When GPU 6 switches to the next rendering unit, graphics driver 10 again performs the process described above to automatically select a rendering mode for the now current rendering unit. Hence, different rendering modes may be used for consecutive rendering units. FIG. 3 is a block diagram illustrating exemplary functional blocks of graphics driver 10 configured to automatically select a rendering mode for use by GPU 6. As described above, graphics driver 10 may translate application instructions or API calls for a graphics application into commands to be performed by CPU 4 and/or GPU 6. For example, GPU 6 may render graphics data to prepare images for display in response to commands from the graphics application. In order to preserve power and system bandwidth during the rendering processes, graphics driver 10 may automatically select either the immediate rendering mode or the deferred rendering mode for use by GPU 6 based on evaluated metrics. Graphics driver 10 may first collect and store the metrics in metric buffer 24, and then evaluate the metrics in order to select the rendering mode predicted to use less power and/or system bandwidth to render the graphics data.

In the illustrated example of FIG. 3, when executed by CPU 4, graphics driver 10 includes metric collection unit 40, metric evaluation unit 42, and rendering mode selection unit 44. As described above, metric buffer 24 may comprise a local memory buffer within CPU 4. In other examples, metric buffer 24 may comprise a memory buffer within device memory 8 located external to CPU 4.

In the illustrated example, metric buffer 24 includes GPU bandwidth 46, number of render targets 48, dimensions of render targets 49, GPU load 50, CPU load 52, number of vertices/fragments 54, locations of fragments 54, depth test/blending enablement 56, type of application 57, and number of API calls 58. In some cases, metric buffer 24 may include more or fewer metrics associated with rendering graphics data. For example, metric buffer 24 may include additional information collected from GPU performance counters 32 of GPU 6 in FIG. 2. In addition, metric buffer 24 may also include metrics regarding whether scene overdraw occurs for the in rendering unit, whether mid-render updates occur in render targets 26 during rendering, whether transform feedback is used, whether fragments in the rendering unit are read from frame buffer 28, a number of state updates for the rendering unit, and other metrics that may indicate a mid-frame resolve. Metric buffer 24 should include at least two metrics, such as GPU bandwidth 46 and number of render targets 48.

Graphics driver 10 may collect and evaluate the metrics to automatically select a rendering mode for use by GPU 6 at each rendering boundary within the graphics data. As described above, a rendering boundary may comprise a transition period between rendering units, e.g., when GPU 6 finishes rendering a previous rendering unit and begins rendering a current rendering unit. The rendering unit may include a set of frames, a frame, a portion of a frame, multiple render targets associated with a frame, a single render target associated with a frame, or a portion of a single render target. At a given rendering boundary, graphics driver 10, running on CPU 4, executes metric collection unit 40 to collect metrics associated with rendering graphics data of one or more rendering units. For example, metric collection unit 40 may collect metrics associated with rendering the graphics data of a previous rendering unit and/or a current rendering unit. During processing of the graphics data, GPU 6 may be several frames behind CPU 4. Metric collection unit 40 may, therefore, collect metrics from CPU 4 associated with rendering graphics data of the current rendering unit. At the same time, metric collection unit 40 may also collect metrics from GPU 6 associated with rendering graphics data of a previous rendering unit.

As an example, metric collection unit 40 may collect an amount of GPU bandwidth 46 used during rendering graphics data of a previous rendering unit from GPU performance counters 32 of GPU 6. In some cases, collecting information from GPU performance counter 32 may require a performance stall of GPU 6. Frequently stalling the performance of GPU 6 may cause an undesirable increase in the performance cost of rendering graphics data. Metric collection unit 40, therefore, may not collect information from GPU performance counters 32 at every rendering boundary, especially where the rendering boundaries occur between each frame or between each render target associated with a frame. In other cases, an amount of GPU bandwidth may be determined based on a number of vertices/fragments 54 for the previous or current rendering unit collected from graphics application 20 executed on CPU 4. A large amount of system bandwidth used by GPU 6 to render graphics data may indicate that GPU 6 is making a large number of read and/or write requests to device memory 8 in the immediate rendering mode.

Metric collection unit 40 may also collect a number of render targets 48 defined for a frame from graphics application 20 executed on CPU 4. As described above, render targets 26 comprise frame buffers stored in device memory 8 that each holds a certain type of graphics data for the associated frame, such as texture data, color data, and depth data. In order to render the frame, GPU 6 renders the graphics data within each of render targets 26 associated with the frame separately and then combines the rendered graphics data in frame buffer 28. The greater the number of render targets defined for a given frame, the greater the number of rendering passes is required to fully render the frame for display. In some cases, number of render targets 48 may include a number of multiple render targets included in render targets 26. As described above, multiple render targets comprise frame buffers that hold the same type of data, e.g., color data, for a frame, and may be rendered simultaneously.

In addition, metric collection unit 40 may collect dimensions of render targets 49 defined for a frame from graphics application 20 executed on CPU 4. The dimensions may comprise a height and width for each of render targets 26 stored in device memory 8 for a given frame. The dimensions may also include a depth or bits per pixel value for each of render targets 26. Large render targets defined for a given frame may indicate that the frame includes a complex graphics scene for rendering that may require many read-modify-write operations.

As another example, metric collection unit 40 may collect an amount of GPU load 50 on registers of GPU 6 during rendering of graphics data of a previous rendering unit. Metric collection unit 40 may also collect an amount of CPU load 52 on registers of CPU 4 during rendering of graphics data of a previous or current rendering unit. The load amounts of GPU 6 and CPU 4 may indicate where any performance bottlenecks may be occurring during rendering of the graphics data.

Metric collection unit 40 may also collect a number of vertices/fragments 54 for a previous or current rendering unit from graphics application 20 executed on CPU 4. As stated above, the number of vertices and/or fragments included in a given frame may be used to determine an amount of GPU bandwidth that will be required to render the graphics data of the frame. In addition, metric collection unit 40 may collect locations of fragments 55 in a previous or current rendering unit from graphics application 20 executed on CPU 4. The locations of the fragments 55 may indicate whether a large number of fragments is spread across the rendering unit in a simple graphics scene, or clustered in one area of the rendering unit as a complex graphics scene.

In a further example, metric collection unit 40 collects whether a previous or current rendering unit is depth test/blending enabled 56 from graphics application 20 executed on CPU 4. When enabled and performed for a given rendering unit, the graphics operations of depth testing and pixel blending require many read-modify-write operations. In some cases, depth test/blending enabled 56 may also indicate whether stencil testing is enabled.

Metric collection 40 also collects a type of application 57 executed on CPU 4 and/or GPU 6 for a previous or current rendering unit. The type of application 57, i.e., graphics application 20, executed on CPU 4 and/or GPU 6 may indicate a general level of complexity for the graphics scenes generated for rendering. In addition, metric collection unit 40 may collect a number of API calls 58, e.g., calls to draw primitives or triangles with the graphics data, for a previous or current rendering unit from graphics API 22 executed on CPU 4. When a given rendering unit includes a large number of API calls, it may be more likely that a large number of primitives will be re-drawn for multiple tiles in the deferred rendering mode.

Once the metrics are collected and stored in metric buffer 24, graphics driver 10 executes metric evaluation unit 42 to evaluate at least two of the metrics to predict which of the immediate rendering mode and the deferred rendering mode will use less power and/or system bandwidth to render the graphics data of the current rendering unit. Metric evaluation unit 42 may apply a weighting scheme to the collected metrics stored in metric buffer 24. For example, metric evaluation unit 42 may execute an algorithm that assigns certain amounts of weight to two or more of the metrics. The weighting scheme may apply an equal amount of weight to two or more of the metrics, or may apply a different amount of weight to each of the metrics. In some cases, the weighting scheme algorithm may be pre-programmed into graphics driver 10. In other cases, the weighting scheme algorithm may be set by a developer via graphics API 22. In this way, the weighting scheme algorithm may be varied over time based on a type of graphics data to be rendered, system requirements and performance of CPU 4 and GPU 6, or other considerations.

As one specific example, metric evaluation unit 42 may apply the greatest weight to the metrics of GPU bandwidth 46 and number of render targets 48. In some cases, metric evaluation unit 42 may apply an equal amount of weight to GPU bandwidth 46 and number of render targets 48. In other cases, metric evaluation unit 42 may apply slightly more weight to one of GPU bandwidth 46 and number of render targets 48.

When GPU bandwidth 46 is high during rendering, it may indicate that rendering engine 12 of GPU 6 is performing a large number of read and/or write requests to device memory 8, which is external to GPU 6. This may occur when rendering engine 12 is performing color blending or depth testing operations that require a large number of read-modify-write operations with device memory 8 in the immediate rendering mode. When the amount of GPU bandwidth 46 is high, therefore, it may be more efficient to switch to the deferred rendering mode to reduce the system bandwidth usage. In the deferred rendering mode, GPU 6 may perform the read and/or write requests to tile buffer 30, located locally on GPU 6, using little power and no system bandwidth. In this way, the deferred rendering mode will likely reduce the amount of system bandwidth used by GPU 6 during rendering of graphics data for the current rendering unit.

The metric evaluation should not, however, rely solely on one metric. For example, merely relying on GPU bandwidth 46 fails to take into account the processing resources required to set up the tiling pass to divide the rendering unit into tiles and then separately render each tile. Instead, metric evaluation unit 42 may compare the bandwidth costs with the overhead costs for rendering graphics data in the current rendering unit to predict the most efficient rendering mode for use by GPU 6.

In order to determine the overhead costs, performance evaluation unit 42 may evaluate the number of render targets 48 defined for a current rendering unit. As described above, in order to render the frame, GPU 6 renders the graphics data within each of the render targets associated with the frame separately and then combines the rendered graphics data in frame buffer 28. When the number of render targets 48 defined for a given frame is high, a greater number of rendering passes is required to fully render the frame for display. When the number of render targets 48 is high, therefore, it may be more efficient to switch to the immediate rendering mode to reduce the overhead cost by eliminating the need to set up tiling passes for each render target and render each tile of each render target associated with the frame.

In the immediate rendering mode, GPU 6 may directly render graphics data in each render target associated with the frame to frame buffer 28 without performing a separate tiling pass and tile rendering for each render target. In this way, using the immediate rendering mode will likely reduce the amount of processing resources used by CPU 4 and/or GPU 6 during rendering of graphics data for the current rendering unit.

When GPU bandwidth 46 is high and the number of render targets 48 is low, therefore, metric evaluation unit 42 may predict that the deferred rendering mode is the most efficient for the current rendering unit. As described above, the deferred rendering mode may use less power and system bandwidth to render graphics data of a rendering unit when the graphics data represents a complex graphics scene with pixel blending and depth testing that requires many read-modify-write functions. When GPU bandwidth 46 is high but the number of render targets 48 is low, the overhead cost of setting up a tiling pass and rendering a plurality of tiles for each render target does not override the bandwidth reduction of the deferred rendering mode.

On the other hand, when GPU bandwidth 46 is low and the number of render targets 48 is high, metric evaluation unit 42 may predict that the immediate rendering mode is the most efficient for the current rendering unit. As described above, the immediate rendering mode may use less power and system bandwidth to render graphics data of a rendering unit when the graphics data represents a simple graphics scene where the deferred rendering mode provides no bandwidth reduction but acts as a drain on processing resources. When GPU bandwidth 46 is low but the number of render targets 48 is high, the overhead cost of setting up a tiling pass and rendering a plurality of tiles for each render target overrides any bandwidth reduction of the deferred rendering mode.

In some cases it may not be immediately evident, based on GPU bandwidth 46 and the number of render targets 48, which rendering mode will use less power and/or system bandwidth during rendering. For example, when GPU bandwidth 46 and the number of render targets 48 are both low or both high, it may be unclear whether the overhead cost of setting up the tiling passes and tile rendering for the deferred rendering mode will override the bandwidth reduction of the deferred rendering mode. In those cases, metric evaluation unit 42 may look to the next weighted metric to predict the most efficient rendering mode for the current rendering unit.

Metric evaluation unit 42 may then evaluate, for example, GPU load 50 and CPU load 52 to determine where any bottlenecks may be occurring during rendering. When CPU load 52 is high, it may indicate a bottleneck in CPU 4 due to additional overhead costs in graphics driver 10 with the deferred rendering mode. In this case, it may be more efficient to use the immediate rendering mode and shift more processing burden onto GPU 6. In other examples, performance evaluation unit 42 may evaluate the number of API calls 58 to determine a number of primitive or triangle draws for a rendering unit. When the number of API calls 58 is high, e.g., more than 2,000 calls per rendering unit, it may be more efficient to use the immediate rendering mode because the overhead cost of having to re-draw a large number of primitives for each tile of the rendering unit may override the bandwidth reduction of the deferred rendering mode.

Once the metrics are evaluated, graphics driver 10 executes rendering mode selection unit 44 to select the immediate rendering mode or the deferred rendering mode based on the evaluated metrics. More specifically, rendering mode selection unit 44 may select the rendering mode predicted by metric evaluation unit 42 to use less power and/or system bandwidth to render the graphics data of the current rendering unit. Rendering mode selection unit 44 may then configure GPU 6 to operate according to the selected rendering mode to render graphics data of the current rendering unit. Configuring GPU 6 may comprise programming registers of GPU 6 to send the rendered graphics data output from rendering engine 12 directly to frame buffer 28, in the case of the immediate rendering mode, or to tile buffer 30, in the case of deferred rendering mode.

In some cases, rendering mode selection unit of graphics driver 10 may also receive a manually selected or indicated rendering mode from a developer or other user via graphics API 22. The manually selected rendering mode may override the automatically selected rendering mode. When a manually selected rendering mode is received, rendering mode selection unit 44 may configure GPU 6 to operate according to the manually selected rendering mode. In this way, a developer may be able to control the rendering mode used by GPU 6 regardless of which rendering mode is predicted to use less power and/or system bandwidth during rendering.

Figure 4:
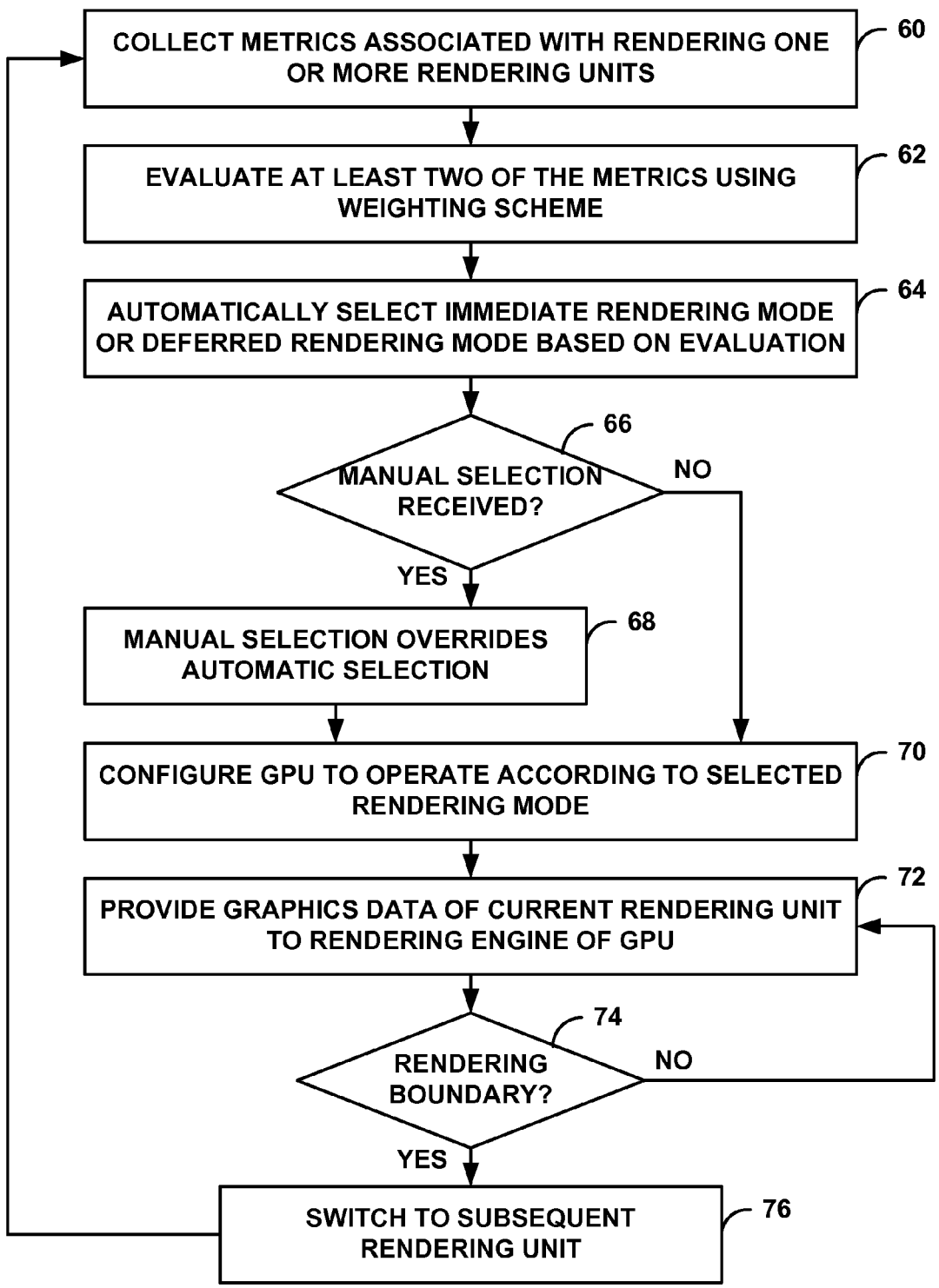
FIG. 4 is a flow chart illustrating an example operation of the graphics driver automatically selecting a rendering mode for use by the GPU.

FIG. 4 is a flow chart illustrating an example operation of graphics driver 10 automatically selecting a rendering mode for use by GPU 6. The illustrated flow chart will be described with reference to graphics device 2 from FIG. 2. During execution of graphics application 20 on CPU 4, graphics driver 10 may command GPU 6 to render graphics data to generate an image for display. Graphics driver 10 may also automatically select either the immediate rendering mode or the deferred rendering mode for use by GPU 6 based on which is predicted to use the least amount of power and/or system bandwidth to render the graphics data.

The graphics data may comprise a plurality of rendering units. A rendering unit of the graphics data may include a set of frames, a frame, a portion of a frame, multiple render targets associated with a frame, a single render target associated with a frame, or a portion of a single render target. Graphics driver 10 may select a rendering mode for a current rendering unit at a rendering boundary when GPU 6 is switching from a previous rendering unit to the current rendering unit.

At a given rendering boundary, graphics driver 10 running on CPU 4 collects metrics associated with rendering graphics data of one or more rendering units (60). Typically, graphics driver 10 collects metrics associated with rendering graphics data of a previous rendering unit from GPU 6 and collects metrics associated with rendering graphics data of the current rendering unit from CPU 4. Graphics driver 10 may then store the collected metrics in metric buffer 24. An exemplary operation of collecting metrics is described in more detail in FIG. 5.

Graphics driver 10 next evaluates at least two of the metrics using a weighting scheme (62). In this way, graphics driver 10 may predict which of the immediate rendering mode and the deferred rendering mode will use less power and/or system bandwidth to render the graphics data of the current rendering unit. For example, graphics driver 10 may apply a weighting scheme to at least the metrics of GPU bandwidth and a number of render targets defined for a frame. Graphics driver 10 may then evaluate whether the overhead costs associated with setting up the deferred rendering mode override the bandwidth reduction of the deferred rendering mode for the graphics data of the current rendering unit. An exemplary operation of evaluating metrics is described in more detail in FIG. 6.

Once the metrics are evaluated, graphics driver 10 automatically selects the immediate rendering mode or the deferred rendering mode based on the evaluation (64). More specifically, rendering mode selection unit 44 may select the rendering mode predicted to use less power and/or system bandwidth to render the graphics data of the current rendering unit.

In some cases, graphics driver 10 may also receive a manually selected rendering mode from a developer or other user via graphics API 22 (YES branch of 66). The manually selected rendering mode received by graphics driver 10 may override the automatically selected rendering mode (68). In this way, a developer may be able to control the rendering mode used by GPU 6 regardless of which rendering mode is predicted to use less power and/or system bandwidth during rendering.

Regardless of whether the rendering mode is automatically selected based on evaluated metrics (NO branch of 66) or manually selected by a user (YES branch of 66, 68), graphics driver 10 configures GPU 6 to operate according to the selected rendering mode to render graphics data of the current rendering unit (70). Configuring GPU 6 may comprise programming registers of GPU 6 to send the rendered graphics data output from rendering engine 12 directly to frame buffer 28, in the case of the immediate rendering mode, or to tile buffer 30, in the case of deferred rendering mode.

Graphics driver 10 may then provide graphics data of the current rendering unit to rendering engine 12 of GPU 6 configured to operate according to the selected rendering mode (72). Until GPU 6 reaches a rendering boundary in the graphics data (NO branch of 74), graphics driver 10 will continue to provide graphics data of the current rendering unit to rendering engine 12 of GPU 6 (72). Once GPU 6 reaches a rendering boundary and switches from the current rendering unit to a subsequent rendering unit (YES branch of 74), graphics driver 10 also switches to the subsequent rendering unit (76). Graphics driver 10 then performs the automatic rendering mode selection process described above for the subsequent rendering unit.

Figure 5:
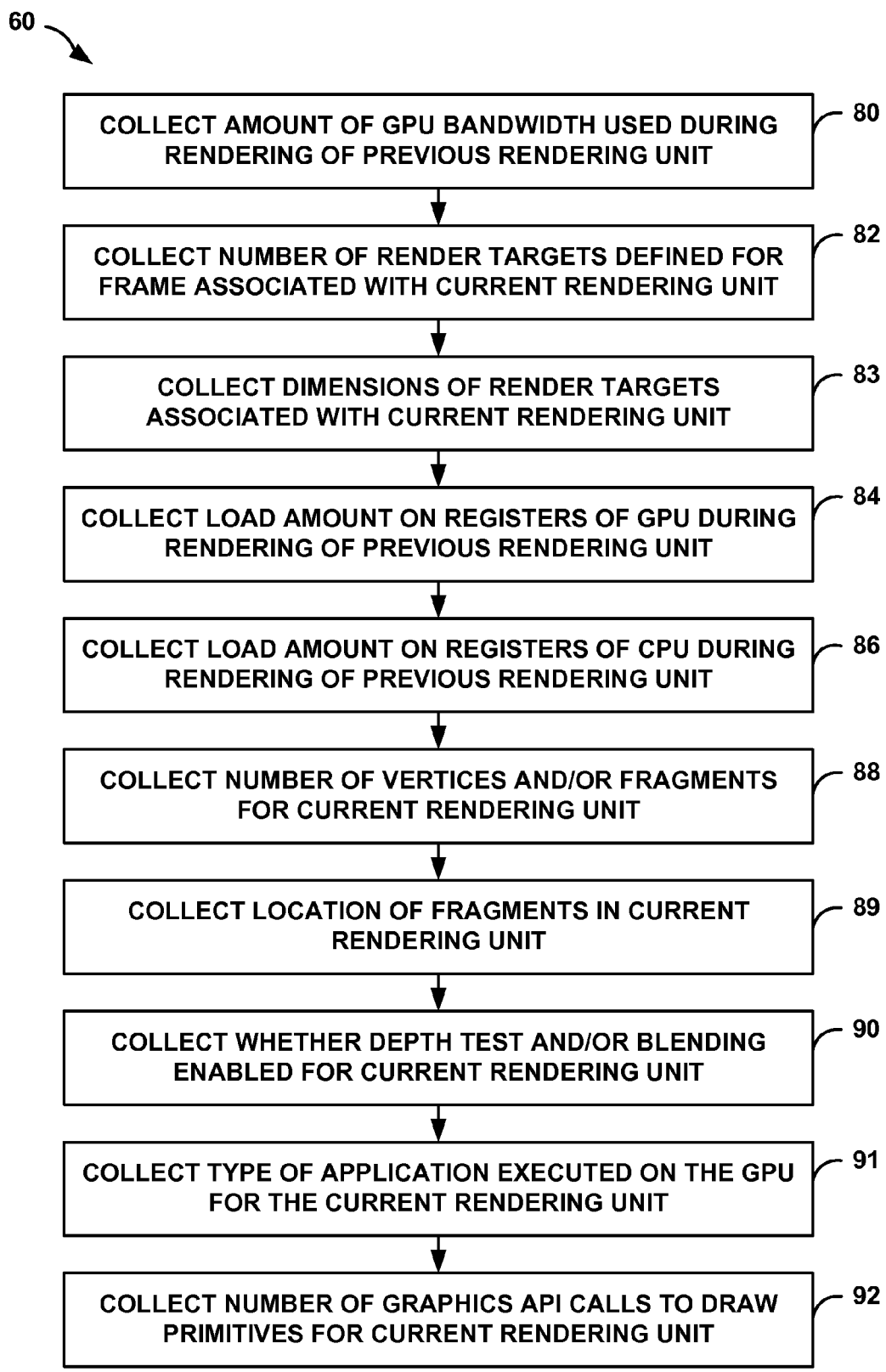
FIG. 5 is a flow chart illustrating an example operation of the graphics driver collecting metrics associated with rendering graphics data of one or more rendering units.

FIG. 5 is a flow chart illustrating an example operation of graphics driver 10 collecting metrics associated with rendering graphics data of one or more rendering units (step 60 from FIG. 4). The illustrated flow chart will be described with reference to metric collection unit 40 of graphics driver 10 from FIG. 3. At a given rendering boundary, graphics driver 10 executes metric collection unit 40 to collect metrics associated with rendering graphics data of a previous rendering unit and/or a current rendering unit. For example, metric collection unit 40 may collect metrics from CPU 4 associated with rendering graphics data of a current rendering unit, and collect metrics from GPU 6 associated with rendering graphics data of a previous rendering unit.

Metric collection unit 40 may collect an amount of GPU bandwidth 46 used during rendering of a previous rendering unit from GPU performance counters 32 of GPU 6 (80). In some cases, metric collection unit 40 may not collect information from GPU performance counters 32 at every rendering boundary. An amount of GPU bandwidth may then be determined based on a number of vertices/fragments 54 for the previous or current rendering unit collected from graphics application 20 executed on CPU 4 (step 88 below). A large amount of bandwidth used by GPU 6 to render graphics data may indicate that GPU 6 is making a large number of read and/or write requests to device memory 8.

Metric collection unit 40 may also collect a number of render targets 48 defined for a frame associated with a current rendering unit from graphics application 20 executed on CPU 4 (82). The greater the number of render targets defined for a given frame, the greater the number of rendering passes required to fully render the frame for display. Metric collection unit 40 may collect dimensions of render targets 49 defined for a frame associated with a current rendering unit from graphics application 20 executed on CPU 4 (83). The dimensions may comprise a height, width, and bits per pixel for each of render targets 26 stored in device memory 8 for a given frame. Large render targets defined for a given frame may indicate that the frame includes a complex graphics scene for rendering that may require many read-modify-write operations.

Metric collection unit 40 may collect an amount of GPU load 50 on registers of GPU 6 during rendering of a previous rendering unit (84). Metric collection unit 40 may also collect an amount of CPU load 52 on registers of CPU 4 during rendering of a previous rendering unit (86). The load amounts of GPU 6 and CPU 4 may indicate where any performance bottlenecks may be occurring during rendering of the graphics data.

Metric collection unit 40 may collect a number of vertices/fragments 54 for a current rendering unit from graphics application 20 executed on CPU 4 (88). As stated above, the number of vertices and/or fragments included in the graphics data of a given rendering unit may be used to determine an amount of GPU bandwidth that will be required to render the graphics data of the rendering unit. Metric collection unit 40 may also collect locations of fragments 55 in a current rendering unit from graphics application 20 executed on CPU 4 (89). The locations of the fragments may indicate whether a large number of fragments is spread across the rendering unit in a simple graphics scene, or clustered in one area of the rendering unit as a complex graphics scene.

Metric collection unit 40 may collect whether a current rendering unit is depth test/blending enabled 56 from graphics application 20 executed on CPU 4 (90). When enabled and performed for a given rendering unit, the graphics operations of depth testing and pixel blending require many read-modify-write operations. Metric collection 40 may also collect a type of application 57 executed on CPU 4 and/or GPU 6 for a current rendering unit (91). The type of application, i.e., graphics application 20, executed on CPU 4 and/or GPU 6 may indicate a general level of complexity for the graphics scenes generated for rendering.

In addition, metric collection unit 40 may collect a number of API calls 56, e.g., calls to draw primitives or triangles with the graphics data, for a previous or current rendering unit from graphics API 22 executed on CPU 4 (92). When a given rendering unit includes a large number of API calls, it may be more likely that a large number of primitives will need to be re-drawn for multiple tiles in the deferred rendering mode. Metric collection unit 40 of graphics driver 10 may then store the collected metrics in metric buffer 24.

Figure 6:
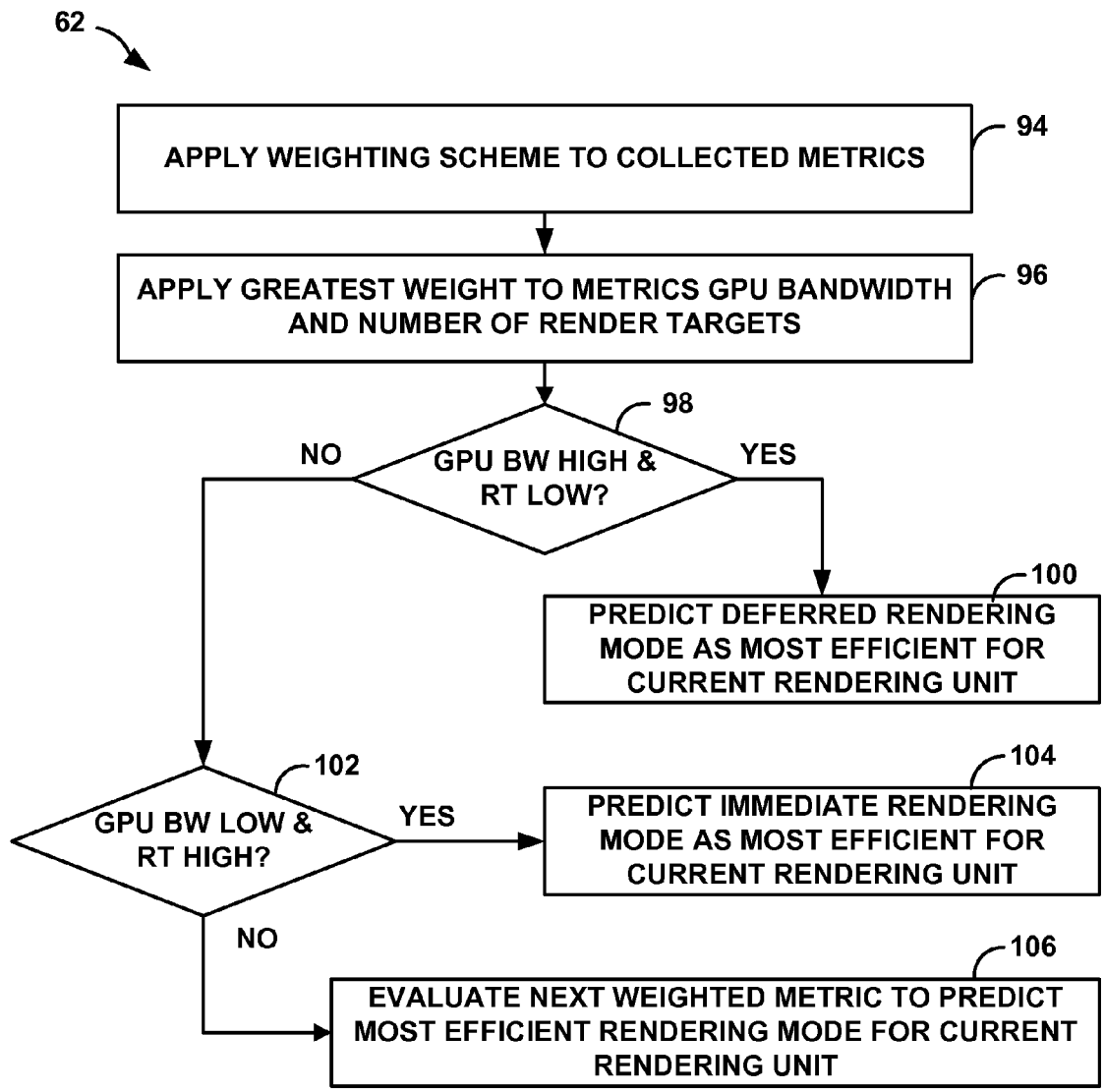
FIG. 6 is a flow chart illustrating an example operation of the graphics driver evaluating the metrics using a weighting scheme.

FIG. 6 is a flow chart illustrating an example operation of graphics driver 10 evaluating the metrics using a weighting scheme (step 62 from FIG. 4). The illustrated flow chart will be described with reference to metric evaluation unit 42 of graphics driver 10 from FIG. 3. Once the metrics are collected and stored in metric buffer 24, graphics driver 10 executes metric evaluation unit 42 to evaluate at least two of the metrics to predict which of the immediate rendering mode and the deferred rendering mode will use less power and/or system bandwidth to render the graphics data of the current rendering unit.

Metric evaluation unit 42 applies a weighting scheme to the collected metrics stored in metric buffer 24 (94). For example, metric evaluation unit 42 may execute an algorithm that assigns certain amounts of weight to two or more of the metrics. In the illustrated example operation, metric evaluation 42 applies the greatest weight to the metrics of GPU bandwidth 46 and number of render targets 48 (96).

When GPU bandwidth 46 is high and the number of render targets 48 is low (YES branch of 98), metric evaluation unit 42 may predict that the deferred rendering mode is the most efficient for the current rendering unit (100). As described above, the deferred rendering mode may use less system bandwidth and power to render graphics data of a rendering unit when the graphics data represents a complex graphics scene with pixel blending and depth testing that requires many read-modify-write functions. When GPU bandwidth 46 is high but the number of render targets 48 is low, the overhead cost of setting up a tiling pass and rendering a plurality of tiles for each render target does not override the bandwidth reduction of the deferred rendering mode.

When GPU bandwidth 46 is low and the number of render targets 48 is high (NO branch of 98 & YES branch of 102), metric evaluation unit 42 may predict that the immediate rendering mode is the most efficient for the current rendering unit (104). As described above, the immediate rendering mode may use less system bandwidth and power to render graphics data of a rendering unit when the graphics data represents a simple graphics scene where the deferred rendering mode provides no bandwidth reduction but acts as a drain on processing resources. When GPU bandwidth 46 is low but the number of render targets 48 is high, the overhead cost of setting up a tiling pass and rendering a plurality of tiles for each render target overrides any bandwidth reduction of the deferred rendering mode.

When GPU bandwidth 46 is low and the number of render targets 48 is also low, or when GPU bandwidth 46 is high and the number of render targets 48 is also high (NO branch of 98 & NO branch of 102), metric evaluation unit 42 may look to the next weighted metric to predict the most efficient rendering mode for the current rendering unit (106). For example, when GPU bandwidth 46 and the number of render targets 48 are both low or both high, it may be unclear whether the overhead cost of setting up the tiling passes and tile rendering for the deferred rendering mode will override the bandwidth reduction of the deferred rendering mode. In this case, any additional weighted metrics may be used when it is not immediately evident, based on GPU bandwidth 46 and the number of render targets 48, which rendering mode will use less system bandwidth and/or power during rendering.

The illustrated flowchart of FIG. 6 is merely one example of evaluating metrics using a weighting scheme. In other examples, different amounts of weight may be applied to different metrics. For example, two or more other metrics may be given the greatest weight for predicting the most efficient rendering mode, or all the metrics may be given equal weight. In still other examples, a different evaluation scheme may be used for predicting the most efficient rendering mode.

In one or more examples, the functions described may be implemented in hardware, software, firmware, or any combination thereof. If implemented in software, the functions or operations may be stored as one or more instructions or code on a non-transitory computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of processing graphics data comprising:
evaluating at least two metrics associated with rendering graphics data of one or more rendering units, wherein the metrics comprise an amount of graphics processing unit (GPU) bandwidth used during rendering of a previous rendering unit and one or more processing unit metrics collected during rendering of at least one of the previous rendering unit and a current rendering unit, and wherein evaluating the metrics comprises evaluating the amount of GPU bandwidth used during rendering of the previous rendering unit and the one or more processing unit metrics;
automatically selecting a rendering mode for the current rendering unit as one of an immediate rendering mode and a deferred rendering mode based on the evaluated metrics; and
configuring a GPU to render graphics data of the current rendering unit according to the selected rendering mode.

2. The method of claim 1, wherein each of the rendering units comprises one of a set of frames, a frame, a portion of a frame, multiple render targets associated with a frame, a single render target associated with a frame, or a portion of a single render target associated with a frame.

3. The method of claim 1, further comprising collecting the metrics associated with rendering graphics data of at least one of the previous rendering unit and the current rendering unit.

4. The method of claim 1, wherein evaluating at least two metrics comprises evaluating the amount of GPU bandwidth and one or more of: a number of vertices, a number of fragments, locations of the fragments, a load amount on the GPU, a load amount on a central processing unit (CPU), a number of render targets defined for a frame, a number of multiple render targets (MRTs) defined for a frame, depth test enablement, blending enablement, stencil test enablement, dimensions of render targets, a type of application executed on the GPU, a number of graphics application program interface (API) calls, and GPU hardware performance counter information.

5. The method of claim 1, wherein automatically selecting a rendering mode comprises automatically selecting the rendering mode for the current rendering unit at a rendering boundary in the graphics data between the previous rendering unit and the current rendering unit.

6. The method of claim 1, further comprising:
providing the graphics data of the current rendering unit to the GPU for rendering; and
upon reaching a rendering boundary in the graphics data, switching from the current rendering unit to a subsequent rendering unit.

7. The method of claim 1, wherein evaluating at least two of the metrics comprises applying a weighting scheme to the at least two metrics.

8. The method of claim 1, wherein evaluating at least two of the metrics comprises evaluating at least the amount of GPU bandwidth used during rendering of the previous rendering unit and a number of render targets defined for a frame associated with the current rendering unit.

9. The method of claim 1, wherein evaluating at least two metrics comprises predicting which one of the immediate rendering mode and the deferred rendering mode will use at least one of less power and less system bandwidth to render the graphics data of the current rendering unit.

10. The method of claim 1, wherein automatically selecting a rendering mode comprises automatically selecting the one of the immediate rendering mode and the deferred rendering mode predicted to use at least one of less power and less system bandwidth to render the graphics data of the current rendering unit based on the evaluated metrics.

11. The method of claim 1, wherein configuring a GPU comprises, when the immediate rendering mode is selected as the rendering mode, configuring a rendering engine of the GPU to render graphics data of the current rendering unit directly to a frame buffer.

12. The method of claim 1, wherein configuring a GPU comprises, when the deferred rendering mode is selected as the rendering mode, configuring a rendering engine of the GPU to perform a tiling pass that divides the current rendering unit into a plurality of tiles, render graphics data of each of the plurality of tiles to a tile buffer, and read each of the rendered tiles from the tile buffer to a frame buffer.

13. The method of claim 1, further comprising receiving a manually selected rendering mode that overrides the automatically selected rendering mode, wherein configuring a GPU comprises configuring the GPU to render graphics data of the current rendering unit according to the manually selected rendering mode.

14. The method of claim 13, wherein receiving a manually selected rendering mode comprises executing a graphics application programming interface (API) to receive the manually selected rendering mode from a user.

15. A graphics device for processing graphics data comprising:
a memory buffer that stores metrics associated with rendering graphics data of one or more rendering units; and
one or more processors that evaluate at least two of the metrics, automatically select a rendering mode for the current rendering unit as one of an immediate rendering mode and a deferred rendering mode based on the evaluated metrics, and configure a graphics processing unit (GPU) to render graphics data of the current rendering unit according to the selected rendering mode, wherein the metrics comprise an amount of GPU bandwidth used during rendering of a previous rendering unit and one or more processing unit metrics collected during rendering of at least one of the previous rendering unit and a current rendering unit, and wherein evaluating the metrics comprises evaluating the amount of GPU bandwidth used during rendering of the previous rendering unit and the one or more processing unit metrics.

16. The graphics device of claim 15, wherein the one or more processors comprise one or more of a central processing unit (CPU) and the GPU.

17. The graphics device of claim 15, wherein each of the rendering units comprises one of a set of frames, a frame, a portion of a frame, multiple render targets associated with a frame, a single render target associated with a frame, or a portion of a single render target associated with a frame.

18. The graphics device of claim 15, wherein the processors collect the metrics associated with rendering graphics data of at least one of the previous rendering unit and the current rendering unit.

19. The graphics device of claim 15, wherein the metrics comprise the amount of GPU bandwidth and one or more of: a number of vertices, a number of fragments, locations of the fragments, a load amount on the GPU, a load amount on a central processing unit (CPU), a number of render targets defined for a frame, a number of multiple render targets (MRTs) defined for a frame, depth test enablement, blending enablement, stencil test enablement, dimensions of render targets, a type of application executed on the GPU, a number of graphics application program interface (API) calls, and GPU hardware performance counter information.

20. The graphics device of claim 15, wherein the processors automatically select the rendering mode for the current rendering unit at a rendering boundary in the graphics data between the previous rendering unit and the current rendering unit.

21. The graphics device of claim 15, wherein the processors:
provide the graphics data of the current rendering unit to the GPU for rendering; and
upon reaching a rendering boundary in the graphics data, switch from the current rendering unit to a subsequent rendering unit.

22. The graphics device of claim 15, wherein the processors evaluate at least two of the metrics by applying a weighting scheme to the at least two metrics.

23. The graphics device of claim 15, wherein the processors evaluate at least the amount of GPU bandwidth used during rendering of the previous rendering unit and a number of render targets defined for a frame associated with the current rendering unit.

24. The graphics device of claim 15, wherein the processors evaluate at least two of the metrics to predict which one of the immediate rendering mode and the deferred rendering mode will use at least one of less power and less system bandwidth to render the graphics data of the current rendering unit.

25. The graphics device of claim 15, wherein the processors automatically select the one of the immediate rendering mode and the deferred rendering mode predicted to use at least one of less power and less system bandwidth to render the graphics data of the current rendering unit based on the evaluated metrics.

26. The graphics device of claim 15, wherein the GPU includes a rendering engine, and wherein, when the immediate rendering mode is selected as the rendering mode, the processors configure the rendering engine of the GPU to render graphics data of the current rendering unit directly to a frame buffer.

27. The graphics device of claim 15, wherein the GPU includes a rendering engine, and wherein, when the deferred rendering mode is selected as the rendering mode, the processors configure the rendering engine of the GPU to perform a tiling pass that divides the current rendering unit into a plurality of tiles, render graphics data of each of the plurality of tiles to a tile buffer, and read each of the rendered tiles from the tile buffer to a frame buffer.

28. The graphics device of claim 15, wherein the processors receive a manually selected rendering mode that overrides the automatically selected rendering mode, and configure the GPU to render graphics data of the current rendering unit according to the manually selected rendering mode.

29. The graphics device of claim 28, wherein the processors execute a graphics application programming interface (API) to receive the manually selected rendering mode from a user.

30. A graphics device for processing graphics data comprising:
means for evaluating at least two metrics associated with rendering graphics data of one or more rendering units, wherein the metrics comprise an amount of graphics processing unit (GPU) bandwidth used during rendering of a previous rendering unit and one or more processing unit metrics collected during rendering of at least one of the previous rendering unit and a current rendering unit, and wherein the means for evaluating the metrics comprises means for evaluating the amount of GPU bandwidth used during rendering of the previous rendering unit and the one or more processing unit metrics;
means for automatically selecting a rendering mode for the current rendering unit as one of an immediate rendering mode and a deferred rendering mode based on the evaluated metrics; and
means for configuring a GPU to render graphics data of the current rendering unit according to the selected rendering mode.

31. The graphics device of claim 30, wherein each of the rendering units comprises one of a set of frames, a frame, a portion of a frame, multiple render targets associated with a frame, a single render target associated with a frame, or a portion of a single render target associated with a frame.

32. The graphics device of claim 30, further comprising means for collecting the metrics associated with rendering graphics data of at least one of the previous rendering unit and the current rendering unit.

33. The graphics device of claim 30, wherein the metrics comprise the amount of GPU bandwidth and one or more of: a number of vertices, a number of fragments, locations of the fragments, a load amount on the GPU, a load amount on a central processing unit (CPU), a number of render targets defined for a frame, a number of multiple render targets (MRTs) defined for a frame, depth test enablement, blending enablement, stencil test enablement, dimensions of render targets, a type of application executed on the GPU, a number of graphics application program interface (API) calls, and GPU hardware performance counter information.

34. The graphics device of claim 30, further comprising means for automatically selecting the rendering mode for the current rendering unit at a rendering boundary in the graphics data between the previous rendering unit and the current rendering unit.

35. The graphics device of claim 30, wherein the means for evaluating at least two of the metrics comprise means for applying a weighting scheme to the at least two metrics.

36. The graphics device of claim 30, wherein the means for evaluating at least two of the metrics comprises means for predicting which one of the immediate rendering mode and the deferred rendering mode will use at least one of less power and less system bandwidth to render the graphics data of the current rendering unit.

37. The graphics device of claim 30, further comprising means for automatically selecting the one of the immediate rendering mode and the deferred rendering mode predicted to use at least one of less power and less system bandwidth to render the graphics data of the current rendering unit based on the evaluated metrics.

38. The graphics device of claim 30, further comprising:
means for receiving a manually selected rendering mode that overrides the automatically selected rendering mode; and
means for configuring the GPU to render graphics data of the current rendering unit according to the manually selected rendering mode.

39. A non-transitory computer-readable medium comprising instructions for processing graphics data that, when executed, cause one or more programmable processors to:
evaluate at least two metrics associated with rendering graphics data of one or more rendering units, wherein the metrics comprise an amount of graphics processing unit (GPU) bandwidth used during rendering of a previous rendering unit and one or more processing unit metrics collected during rendering of at least one of the previous rendering unit and a current rendering unit, and wherein the instructions that cause the one or more programmable processors to evaluate the metrics comprise instructions that, when executed, cause the one or more programmable processors to evaluate the amount of GPU bandwidth used during rendering of the previous rendering unit and the one or more processing unit metrics;
automatically select a rendering mode for the current rendering unit as one of an immediate rendering mode and a deferred rendering mode based on the evaluated metrics; and
configure a GPU to render graphics data of the current rendering unit according to the selected rendering mode.

40. The non-transitory computer-readable medium of claim 39, wherein each of the rendering units comprises one of a set of frames, a frame, a portion of a frame, multiple render targets associated with a frame, a single render target associated with a frame, or a portion of a single render target associated with a frame.

41. The non-transitory computer-readable medium of claim 39, further comprising instructions that cause the programmable processors to collect metrics associated with rendering graphics data of at least one of the previous rendering unit and the current rendering unit.

42. The non-transitory computer-readable medium of claim 39, wherein the instruction cause the programmable processors to evaluate the amount of GPU bandwidth and one or more of: a number of vertices, a number of fragments, locations of the fragments a load amount on the GPU, a load amount on a central processing unit (CPU), a number of render targets defined for a frame, a number of multiple render targets (MRTs) defined for a frame, depth test enablement, blending enablement, stencil test enablement, dimensions of render targets, a type of application executed on the GPU, a number of graphics application program interface (API) calls, and GPU hardware performance counter information.

43. The non-transitory computer-readable medium of claim 39, wherein the instructions cause the programmable processors to automatically select the rendering mode for the current rendering unit at a rendering boundary in the graphics data between the previous rendering unit and the current rendering unit.

44. The non-transitory computer-readable medium of claim 39, wherein the instructions cause the programmable processors to evaluate at least two of the metrics by applying a weighting scheme to the at least two metrics.

45. The non-transitory computer-readable medium of claim 39, wherein the instruction cause the programmable processor to evaluate at least two of the metrics to predict which one of the immediate rendering mode and the deferred rendering mode will use at least one of less power and less system bandwidth to render the graphics data of the current rendering unit.

46. The non-transitory computer-readable medium of claim 39, wherein the instructions cause the programmable processors to automatically select the one of the immediate rendering mode and the deferred rendering mode predicted to use at least one of less power and less system bandwidth to render the graphics data of the current rendering unit based on the evaluated metrics.

47. The non-transitory computer-readable medium of claim 39, further comprising instructions that cause the programmable processors to:
   receive a manually selected rendering mode that overrides the automatically selected rendering mode; and
   configure the GPU to render graphics data of the current rendering unit according to the manually selected rendering mode.

* * * * *